Patented Dec. 27, 1949

2,492,632

UNITED STATES PATENT OFFICE 2,492,632

ALKYL THIENYL KETIMINE FROM ACYL-THIOPHENE AND PRIMARY AMINE REACTION

Howard D. Hartough, Pitman, N. J., assignor to Socony-Vacuum Oil Company, Incorporated, a corporation of New York No Drawing. Application December 3, 1946, Serial No. 713,823

12 Claims. (Cl. 260—329)

This invention relates to a new composition of matter and process for making the same. More particularly, this invention has to do with the synthesis of thienyl ketimines by direct condensation of acylthiophenes with primary amines.

Ketones in general are known to undergo condensation easily with standard reagents such as hydrazine, phenylhydrazine, 2, 4-dinitrophenylhydrazine, semicarbazide, and hydroxylamine. These are standard reagents to determine ketones quantitatively and the reaction takes place smoothly and efficiently. In contrast to these reactions, direct condensation between aromatic ketones and primary amines has not heretofore been effected. To prepare the so-called Schiff's base aromatic ketones, such as that of acetophenone, it has heretofore been necessary to employ a circuitous procedure in which the diketal is first synthesized and this product then reacted with the desired primary amine.

It has now been found in accordance with the procedure described herein that alkyl thienyl ketones unexpectedly undergo direct condensation with primary amines in contrast to aromatic ketones of the benzene series and thus lead to the formation of a new series of compounds, namely, the thienyl alkyl ketimines, which are valuable intermediate products for the manufacture of dyes. The reaction of this invention, comprising condensation of a primary amine with an alkyl thienyl ketone and removal of water formed as a result of said condensation from the reaction product mixture, may be represented in accordance with the following general equation:

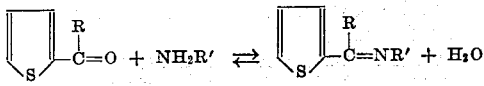

where R is an alkyl group of from one to seventeen carbon atoms and R' is an aryl or alkyl group of at least five carbon atoms. The present invention also contemplates the condensation of an alkyl thienyl ketone having one or more of its nuclear hydrogen atoms substituted with various other atoms or radicals such as halogen, amino, nitro, and alkyl groups.

The above reaction is preferably carried out in the presence of an inert organic solvent such as toluene, benzene, xylene, etc., and at a temperature above the boiling point of water. Generally, the condensation will be effected under atmospheric pressure so that the temperature will be between about 100° C. and about 150° C. Water may be removed from the reaction product mixture in a mechanical manner by using a water take-off trap where water vapor generated during the course of the reaction is collected and condensed. Such mechanical methods of removing water from reaction mixtures are well known and conventionally employed in the art. An examination of the amount of water collected in the trap is a convenient method for determining substantial completion of the reaction, since the ceasing of evolution of water indicates that the condensation is virtually complete. After condensation of the primary amine and thiophene ketone has taken place, the reaction product mixture is distilled, preferably under reduced pressure, to recover any unreacted amine and thiophene ketone and to collect the desired product of alkyl thienyl ketimine.

The preferable ratio of reactants appears to be an equimolar mixture of primary aliphatic or aromatic amine and alkyl thienyl ketone. Under some conditions it may be desirable to employ more than an equimolar amount of the primary amine. As pointed out above, any unreacted starting materials are readily recovered from the reaction product mixture as low boiling distillates and may be used in further condensation reactions.

Having described in a general way the nature of this invention, the following detailed examples are given by way of illustration:

Example 1

To 150 milliliters of toluene, contained in the flask of a refluxing apparatus furnished with a water take-off trap, were added 63 grams (0.5 mole) of 2-acetylthiophene and 47 grams (0.5 mole) of aniline. The reactants were heated to reflux at a temperature of 130–133° C. for 13 hours. About 5 milliliters of water were collected in the trap. No more water was evolved after 6 more hours of heating at reflux. The contents of the flask were then transferred to a distillation vessel and upon distilling under reduced pressure, 45 grams (46 per cent yield) of a product having a boiling range of 145–153° C. at 4 millimeters pressure were collected. This material crystallized upon standing and was then recrystallized from 150 milliliters of absolute alcohol. The bright yellow crystals so obtained had a melting point of 69-70° C. Analysis showed this product, containing 7.1 per cent nitrogen and 16.1 per cent sulifur, to be N-phenyl-2-thienyl methyl ketimine having the formula:

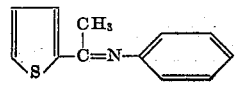

Example 2

To 41 grams (0.325 mole) of 2-acetylthiophene and 42 grams (0.325 mole) of 2-ethylhexylamine in an apparatus similar to that used in Example 1 were added 500 milliliters of toluene. The materials were heated under reflux for 22 hours and 2.5 milliliters of water were collected. The contents of the flask were then transferred to a distillation vessel and upon distilling under reduced pressure, 30 grams of a product having a boiling point range at 4 millimeters pressure of 142–157° C. were collected. Analysis showed the resulting product, containing 6.07 per cent nitrogen, to be N-(2-ethylhexyl)-2-thienyl methyl ketimine having the formula:

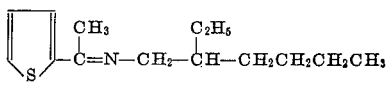

Example 3

To 38.5 grams (0.25 mole) of 2-butanoylthiophene and 46.5 grams (0.50 mole) of aniline in an apparatus similar to that used in Example 1 were added 500 milliliters of toluene. The materials were refluxed for four hours at a temperature of 130–133° C. Only 0.3 milliliter of water was obtained. The mixture was then cooled; 3 grams of iodine were added and the mixture was refluxed for 5 hours longer. A total of 1.0 milliliter of water was collected. The toluene was removed from the reaction product mixture by distillation at atmospheric pressure and the excess aniline and 2-butanoylthiophene were recovered under reduced pressure. Sixteen grams of a product having a boiling point range of 128–130° C. at 1 millimeter pressure were obtained. Analysis showed the resulting product, containing 6.19 per cent nitrogen to be N-phenyl-2-thienyl propyl ketimine having the formula:

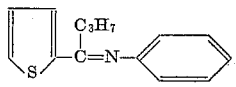

Example 4

Three moles (378 grams) of 2-acetylthiophene and three moles (2.79 grams) of aniline were refluxed in the apparatus of Example 1 with 600 milliliters of xylene at 140° C. for a period of 14 hours. Fourteen milliliters of water were collected at the end of this time. Xylene was removed from the reaction product mixture by distillation at atmospheric pressure. The remaining mixture was then distilled under reduced pressure to yield 118 grams of a product having a boiling point of 155° C. at 5 millimeters pressure. This material crystallized upon standing and was recrystallized from absolute alcohol. The bright yellow crystals had a melting point of 69–70° C. Analysis showed the product to be N-phenyl-2-thienyl methyl ketimine.

From the above examples it will be evident that a primary amine and an alkyl thienyl ketone readily undergo direct condensation without the intermediate formation of a diketal such as has heretofore been necessary in reacting an aromatic amine with an aromatic ketone of the benzene series.

It will be obvious that the invention is not limited to the foregoing examples or to the specific details given therein. Thus, for instance, instead of the alkyl thienyl ketones employed in the above illustrative condensation reactions, any of the thienyl alkyl ketones having alkyl groups containing 1 to 17 carbon atoms may be used. Also, the thienyl group may have one or more of its nuclear hydrogen atoms replaced with amino, halogen, nitro, or alkyl groups. Instead of the aromatic and aliphatic amines shown in the above examples, any of the aromatic or aliphatic amines having at least five and generally not more than 22 carbon atoms may be employed.

The reaction of this invention will usually be carried out in the absence of a catalyst. Under some conditions, however, the use of a condensation catalyst such as zinc chloride, iodine, and the like may be found to be effective. Water may be removed from the reaction product mixture by the method described, using a water take-off trap on the refluxing apparatus or, if the organic solvent employed in aiding the reaction is one which forms a low boiling azeotrope with water, such as benzene or toluene, water resulting from the condensation may be removed from the reaction product mixture in an azeotropic distillation operation. Likewise, it will be realized that if the organic solvent employed does not form an azeotrope with water, various materials which form azeotropes with water, for example, carbon tetrachloride, may be added to the reaction mixture provided they do not interfere with the desired course of the reaction.

The alkyl thienyl ketimines obtained in accordance with the process of this invention represent new organic compounds having distinct color characteristics which are valuable as intermediates in the manufacture of dyes.

The compounds of this invention have also been found to be valuable as additives in the stabilization of petroleum oil fractions, particularly in inhibiting the development of those undesirable products and properties such as acid, sludge, discoloration, and corrosiveness toward alloy-bearing metals, normally encountered under conditions of use. Thus, it is well known that motor oils, especially those refined by certain solvent-extraction methods, tend to oxidize when submitted to high temperatures and to form products that are corrosive to metal bearings. This corrosive action may be quite severe with certain bearings, such as those having the corrosion susceptibility of cadmium-silver alloys, and may cause their failure within a comparatively short time. The following test was used to determine the corrosive action of a motor oil on an automobile rod bearing.

The oil used consisted of Pennsylvania neutral and residuum stocks separately refined by means of chlorex and then blended to give an S. A. E. 20 motor oil with a specific gravity of 0.872, a flash point of 435° F. and a Saybolt Universal viscosity of about 318 seconds at 100° F. The oil was tested by adding a section of a bearing containing a cadmium-silver alloy surface and weighing about 6 grams and heating it to 175° C. for 22 hours while a stream of air was bubbled against the surface of the bearing. The loss in weight of the bearing during this treatment measures the amount of corrosion that has taken place. A sample of the oil containing a stabilizing compound of this invention was run at the same time as a sample of the straight oil, and the loss in weight of the bearing section in the inhibited oil can thus be compared directly with the loss in the uninhibited oil. The results obtained in this test are set forth in the following table:

| Compound Added | Percent Used | Mg. Loss in Weight |
| --- | --- | --- |
| N-phenyl-2-thienyl propyl ketimine | 0 | 17 |
| | 0.06 | 9 |
| | 0.25 | 3 |
| | 0.50 | 0 |
| N-phenyl-2-thienyl methyl ketimine | 0 | 17 |
| | 0.06 | 9 |
| | 0.12 | 3 |
| | 0.25 | 0 |
| | 0.50 | 0 |
| N-(2 ethylhexyl)-2-thienyl methyl ketimine | 0 | 17 |
| | 0.12 | 3 |
| | 0.50 | 0 |

From the foregoing test results, it will be observed that the thienyl alkyl ketimines of this invention are effective stabilizing agents for petroleum oil fractions. The quantity of compound employed as stabilizer to inhibit the deleterious effects of oxidation in the oil may be varied, depending upon the character of the oil and the severity of the conditions to which it is exposed, but, in general, it appears that the desired results may be obtained with an amount ranging from about 0.05 to about 5.0 per cent. It will, of course, be understood that, in addition to the specific compounds set forth above, other thienyl alkyl ketimines falling within the scope of the above disclosed general formula may similarly be employed as addition agents in improving petroleum oil fractions.

I claim:

1. A process for making an alkyl thienyl ketimine which comprises condensing an acyl thiophene with a primary monoamine at a temperature above the boiling point of water, removing water formed as a result of said condensation from the reaction product mixture, and treating said mixture to isolate the desired product therefrom.

2. A process for making an alkyl thienyl ketimine which comprises condensing an acyl thiophene, the acyl group of which is characterized by an alkyl chain of from 1 to 17 carbon atoms with a primary monoamine having at least 5 carbon atoms at a temperature above the boiling point of water, removing water formed as a result of said condensation from the reaction product mixture, and distilling said mixture to isolate the desired product therefrom.

3. A process for making an alkyl thienyl ketimine which comprises condensing an acyl thiophene with at least an equimolar quantity of a primary monoamine at a temperature above the boiling point of water, removing water formed as a result of said condensation from the reaction product mixture, and distilling said mixture to isolate the desired product therefrom.

4. A process for making an alkyl thienyl ketimine which comprises condensing an acyl thiophene with a primary monoamine in the presence of an inert organic solvent and at a temperature above the boiling point of water for such a period that water formed as a result of said condensation is no longer evolved from the reaction product mixture, and thereafter distilling said mixture to isolate the desired product therefrom.

5. A process for making an alkyl thienyl ketimine which comprises condensing an acyl thiophene with a primary monoamine in the presence of an inert organic solvent capable of forming an azeotrope with water, refluxing the reaction mixture at a temperature above the boiling point of water until said condensation is substantially complete, removing water from said reaction mixture by azeotropic distillation and thereafter distilling said mixture to isolate the desired product therefrom.

6. A process for making an alkyl thienyl ketimine which comprises condensing an acyl thiophene, the acyl group of which is characterized by an alkyl chain of from 1 to 17 carbon atoms with at least an equimolar quantity of a primary monoamine having at least 5 carbon atoms, at a temperature between about 100° C. and about 150° C., for such a period that water formed as a result of said condensation is no longer evolved from the reaction product mixture, and thereafter distilling said mixture to isolate the desired product therefrom.

7. A new composition of matter having the general formula:

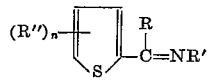

where R is an alkyl group of from one to seventeen carbon atoms, R' is selected from the group consisting of acyl or alkyl radicals of at least five carbon atoms, R'' is a substituent selected from the group consisting of hydrogen, halogen, amino, nitro and alkyl groups, and $n$ is a whole number from 1 to 3.

8. A new composition of matter having the general formula:

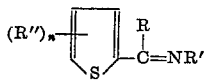

where R is an alkyl group of from one to seventeen carbon atoms, R' is an acyl group, R'' is a substituent selected from the group consisting of hydrogen, halogen, amino, nitro and alkyl groups, and $n$ is a whole number from 1 to 3.

9. A new composition of matter having the general formula:

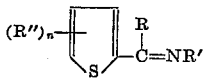

where R is an alkyl group of from one to seventeen carbon atoms, R' is an alkyl group of at least five carbon atoms, R'' is a substituent selected from the group consisting of hydrogen, halogen, amino, nitro and alkyl groups, and $n$ is a whole number from 1 to 3.

10. As a new composition of matter, N-phenyl-2-thienyl methyl ketimine.

11. As a new composition of matter, N-(2 ethylhexyl)-2-thienyl methyl ketimine.

12. As a new composition of matter, N-phenyl-2-thienyl propyl ketimine.

HOWARD D. HARTOUGH.

REFERENCES CITED

The following references are of record in the file of this patent:

UNITED STATES PATENTS

| Number | Name | Date |
| --- | --- | --- |
| 2,154,096 | Loane | Apr. 11, 1939 |
| 2,218,587 | Reddelien | Oct. 22, 1940 |
| 2,264,894 | Shoemaker | Dec. 2, 1941 |
| 2,400,436 | Patterson | May 14, 1946 |
| 2,425,185 | Haury | Aug. 5, 1947 |

Certificate of Correction

Patent No. 2,492,632                                                          December 27, 1949

HOWARD D. HARTOUGH

It is hereby certified that error appears in the printed specification of the above numbered patent requiring correction as follows:

Column 1, line 4, after the word "thienyl" insert *alkyl*;

and that the said Letters Patent should be read with this correction therein that the same may conform to the record of the case in the Patent Office.

Signed and sealed this 23rd day of May, A. D. 1950.

[SEAL]

THOMAS F. MURPHY,
*Assistant Commissioner of Patents.*